US006918608B2

(12) United States Patent
Crisp

(10) Patent No.: US 6,918,608 B2
(45) Date of Patent: Jul. 19, 2005

(54) COLLAPSIBLE PUSHCHAIR/CARRIER

(75) Inventor: David Crisp, London (GB)

(73) Assignee: Micralite Limited (GB)

( * ) Notice: Subject to any disclaimer, the term of this patent is extended or adjusted under 35 U.S.C. 154(b) by 0 days.

(21) Appl. No.: 10/384,081

(22) Filed: Mar. 5, 2003

(65) Prior Publication Data

US 2004/0026896 A1 Feb. 12, 2004

Related U.S. Application Data

(63) Continuation of application No. PCT/GB01/03921, filed on Aug. 31, 2001.

(30) Foreign Application Priority Data

Sep. 8, 2000 (GB) .............................. 0022104

(51) Int. Cl.$^7$ ................................. B62B 7/06
(52) U.S. Cl. ....................... 280/642; 280/647; 280/650; 280/47.38
(58) Field of Search ................................ 280/638, 639, 280/38, 641, 642, 643, 647, 648, 650, 47.38, 47.4, 42

(56) References Cited

U.S. PATENT DOCUMENTS

| 3,936,069 | A | * | 2/1976 | Giordani | 280/650 |
| 4,132,429 | A | * | 1/1979 | Woods | 280/647 |
| 4,181,317 | A |   | 1/1980 | Toda | |
| 4,386,790 | A | * | 6/1983 | Kassai | 280/650 |
| 4,428,598 | A | * | 1/1984 | Kassai | 280/644 |
| 4,506,907 | A | * | 3/1985 | Miyagi | 280/642 |
| 4,681,340 | A | * | 7/1987 | Pasquini | 280/642 |
| 4,844,504 | A | * | 7/1989 | Bigo | 280/642 |
| 5,197,753 | A | * | 3/1993 | Liu | 280/642 |
| 5,622,376 | A | * | 4/1997 | Shamie | 280/642 |
| 5,752,738 | A | * | 5/1998 | Onishi et al. | 297/61 |
| 6,375,213 | B1 | * | 4/2002 | Suzuki | 280/649 |

FOREIGN PATENT DOCUMENTS

| FR | 2259001 | 8/1975 |
| FR | 2358307 | 2/1978 |
| FR | 2495560 | 6/1982 |
| FR | 2564405 | 11/1985 |

* cited by examiner

*Primary Examiner*—Christopher P. Ellis
*Assistant Examiner*—Brian Swenson
(74) *Attorney, Agent, or Firm*—Guathier & Connors LP

(57) ABSTRACT

A collapsible pushchair/carrier has wheels at the front and back. An upstanding spine extends between the rear wheels and handles. A lockable slider assembly can be moved up and down the spine. The front wheels are supported by wheel assemblies connected by pivotable support legs to the slider assembly. Beneath the slider assembly there are pivot joints linked to cranked support arms pivotably connected to the support legs. A foldable transverse strut extends between the front wheel assemblies. A seat is mounted to the ends of the arms remote from the pivot joints to the legs and the spine. The slider assembly can be moved between two operating positions. In one position, the pushchair is operative with the wheels defining a wheelbase between the front and rear wheels and front and rear wheel tracks between the front and rear wheels respectively. In the other position the pushchair is stowed and collapsed with the legs and arms alongside the spine and the front wheels within the rear wheel track. The now folded strut rests on a floor surface to support the stowed pushchair in an upstanding position. In moving between the stowed and operative positions the front wheel assemblies splay outwardly.

11 Claims, 6 Drawing Sheets

COLLAPSIBLE PUSHCHAIR/CARRIER

This application is a continuation of PCT/GB01/03921 filed Aug. 31, 2001.

FIELD OF THE INVENTION

This invention relates to pushchairs and carriers and in particular folding or collapsible pushchairs and carriers.

BACKGROUND OF THE INVENTION

Collapsible pushchairs are known. These generally fall into two categories. First are those that fold in only two dimensions where typically the track remains unaltered but the wheel-base reduces on folding. In the second category are those that fold in three dimensions, where both track and wheel base reduce on folding. While providing for a smaller folded configuration pushchairs of this second type are typically more complex and expensive to make. Further, they are generally more difficult to fold and unfold. The present invention seeks to provide improved collapsible pushchairs. In particular, the present invention seeks to provide collapsible pushchairs which have a small folded configuration and a non-complex mechanism.

SUMMARY OF THE INVENTION

According to one aspect of the invention there is provided a wheeled collapsible pushchair or like carrier comprising a seat, elongate seat support means to support the seat and at least one generally upstanding elongate spine, the seat support means being slidably and pivotably connected to the spine, said pushchair being able to adopt either an open configuration with the seat support means extending away from said spine or a closed stowed configuration, characterized in that the support means takes the form of two support legs, each with a front wheel at one end and slidably and pivotably connected at the other end to the at least one spine so that in the open configuration the legs splay out from the at least one spine towards the associated front wheel and in the closed configuration the two support legs and spine are in a substantially parallel or near parallel orientation.

According to another aspect of the invention there is provided a wheeled collapsible carrier comprising elongate support means pivotably and slidably connected to at least one elongate spine, said carrier being free-standing and self-supporting in both an open configuration and a closed configuration.

Preferably the pushchair or carrier further comprises auxiliary support means to support said elongate support means. Preferably the auxiliary support means are elongate support arms, each pivotably connected to the spine and associated leg. The pushchair or carrier may further comprise an elongate transverse member pivotably connected to the legs. The transverse member can fold to allow the pushchair or carrier to collapse and can also act as a stand in the closed configuration thereby providing a self-supporting structure. In an embodiment with a front wheel at the end of each support leg and a pair of rear wheels at the end of the spine, the track of the front wheels and the wheelbase of the pushchair are reduced in the closed configuration when compared to the open configuration. The track of the rear wheels remains unaltered. The pushchair or carrier may have a double spine structure.

According to a further aspect of the invention there is provided a wheeled collapsible pushchair comprising a first leg, two splayed second legs, a spine and a rigid seat, wherein said first leg is pivotably connected to said second legs and said spine and said seat is pivotably connected to said second legs and said spine so that the pushchair is able to adopt an open configuration with said legs angled away from each other and with said spine angled towards the vertical and is able to pivot to adopt a closed configuration with the first leg, second leg and spine in substantially parallel orientation.

According to a further aspect of the invention there is provided a collapsible pushchair comprising a seat supported on a pair of front wheels and a pair of rear wheels or single rear wheel wherein the front wheels have a larger track than the rear wheels and the pushchair can adopt an open configuration or a closed configuration, the track of the front wheels and the wheel base of the pushchair but not the track of the rear wheels or wheel being reduced in the closed configuration when compared to the open configuration.

In a further aspect a collapsible pushchair or carrier comprises a generally upstanding column or spine, a slider assembly movable up and down along the column, a set of swivellable front steering wheels, at least one rear wheel supporting the column and a system of pivotable levers supporting and lining the front wheels to the column and the slider assembly, whereby the column and the rear wheel maintains their position while the front wheels can be transposed via the lever system between a working position splayed and braced outwardly forwardly of the column and the rear wheel or a stowed position drawn inwardly together and rearwardly adjacently beneath the column.

BRIEF DESCRIPTION OF DRAWINGS

Embodiments of a pushchair constructed in accordance with the invention will now be described, by way of examples only, with reference to the accompanying drawings. Embodiments of the carrier constructed in accordance with the invention are equivalent to the embodiments described but without the pushchair seat. In the drawings.

DESCRIPTION OF PREFERRED EMBODIMENTS

Figure 1:
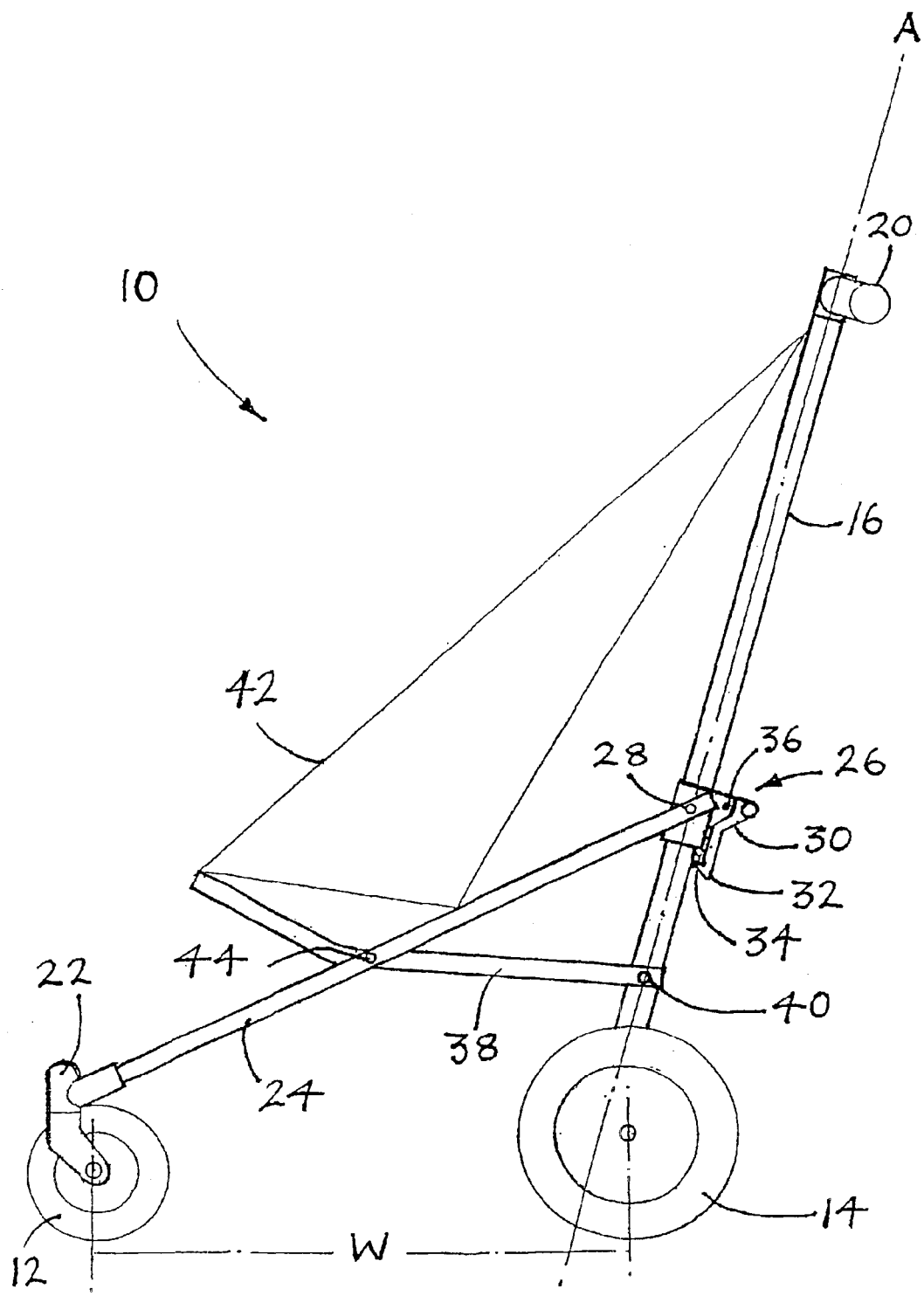
FIG. 1 is a side view of a first embodiment of the pushchair in its open configuration.

FIG. 1 shows a first embodiment of a collapsible pushchair 10 in its unfolded or open configuration used to support and transport a young child or baby. The pushchair 10 comprises a pair of front wheels 12 and a pair of rear wheels 14 and has wheelbase W. A single generally upstanding column or spine 16 joins the rear wheels 14 via axle 18 at one end to a bar with handles 20 at the other. Each front wheel 12 is coupled via a swivellable wheel assembly 22 and an inclined elongate support leg 24 to the spine 16 The wheel assemblies 22 permit the wheels 12 to be steered. Each support leg 24 is slidably and pivotably coupled to the spine 16 via a slider assembly 26 and a pivot joint 28. The slider assembly 26 employs a plain bearing for guiding the assembly for sliding up and down the spine 16. Rocker handle 30 holds the slider assembly 26 in position in the unfolded configuration shown via a releasable catch 32 on the rocker handle 30 and a complementary projection 34 on the spine 16. The rocker handle 30 is pivotably attached to the slider assembly 26 via a pivot 36. Below the slider assembly 26 on the spine 16 there are two elongate cranked support arms 38 each pivotably attached at one end to the spine 16 via a pivot joint 40. Each support arm 38 extends substantially horizontally in a first part 38a and is pivotably attached and via a pivot joint 44 to one of support legs 24 before inclining upwards at second part 38b to support a seat 42. The seat 42 is also supported by each leg 24 and by the spine 16.

Figure 2:
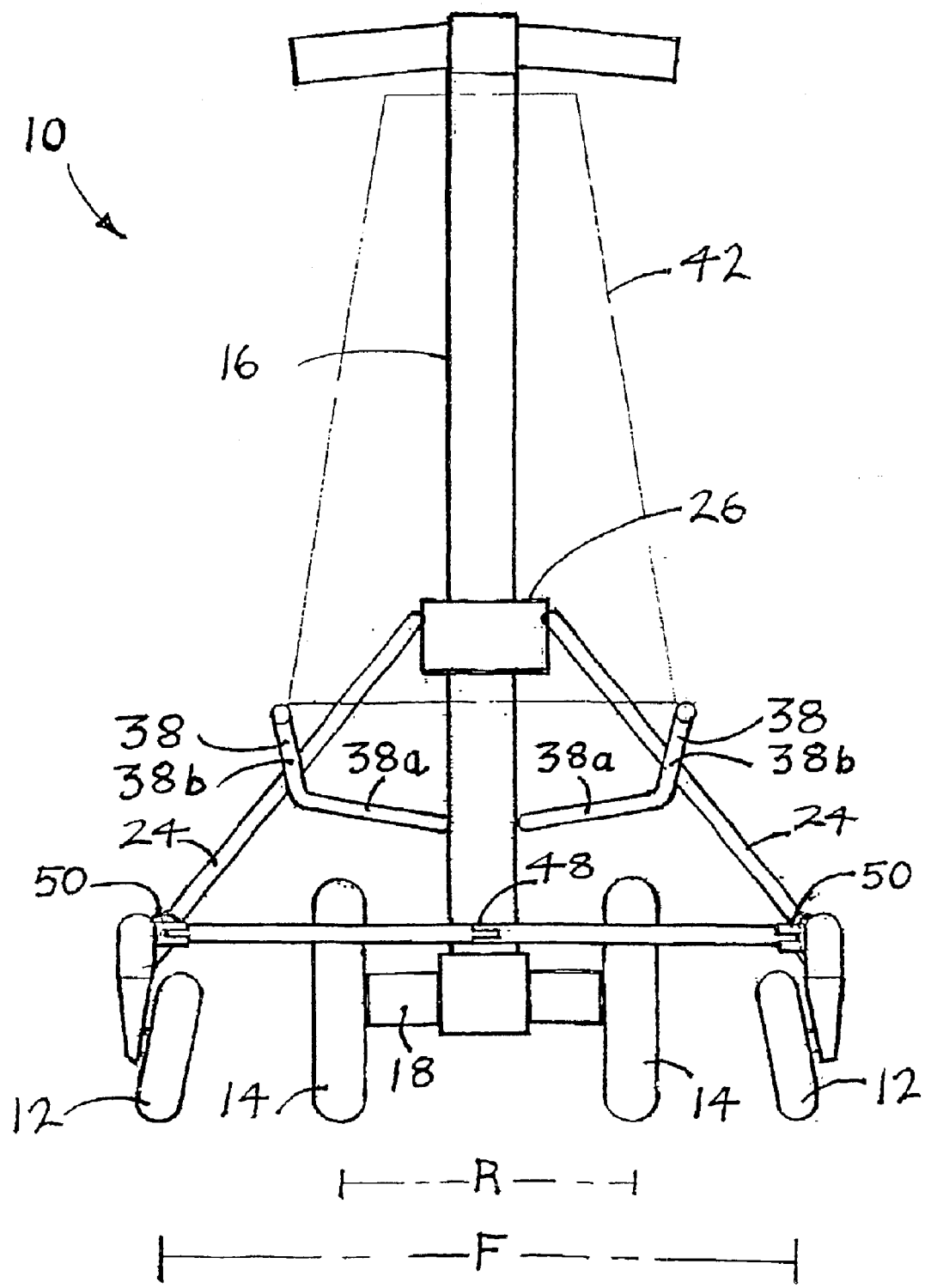
FIG. 2 is a front view of the first embodiment.

FIG. 2 shows the unfolded configuration of the pushchair 10 from the front. This Figure illustrates the relationships between the two arms 38, the two legs 24 and two sets of two wheels 12, 14. The slider assembly 26 can be seen supporting the legs 24 which splay from each other and extend downwards to join the wheel assemblies 22 and the front wheels 12. Each arm 38 can be seen supporting the associated leg 24. An elongate transverse bracing strut 46 bridges between the two wheel assemblies 22 and is attached via pivot joints 50. The transverse foldable bracing strut 46 has a central pivot 48. A catch assembly (not shown) keeps strut 46 extended and locked in the configuration shown. The strut 46 and the legs 24 therefore form a substantially triangular support frame of the unfolded pushchair 10.

As shown in FIG. 2, the front wheels 12 are inclined to keep their contact with the ground below the associated wheel bearings. In alternative embodiments known double wheel constructions are used. As can be seen the front wheels 12 with track F are spaced further apart that the rear wheels (track R).

Figure 3:
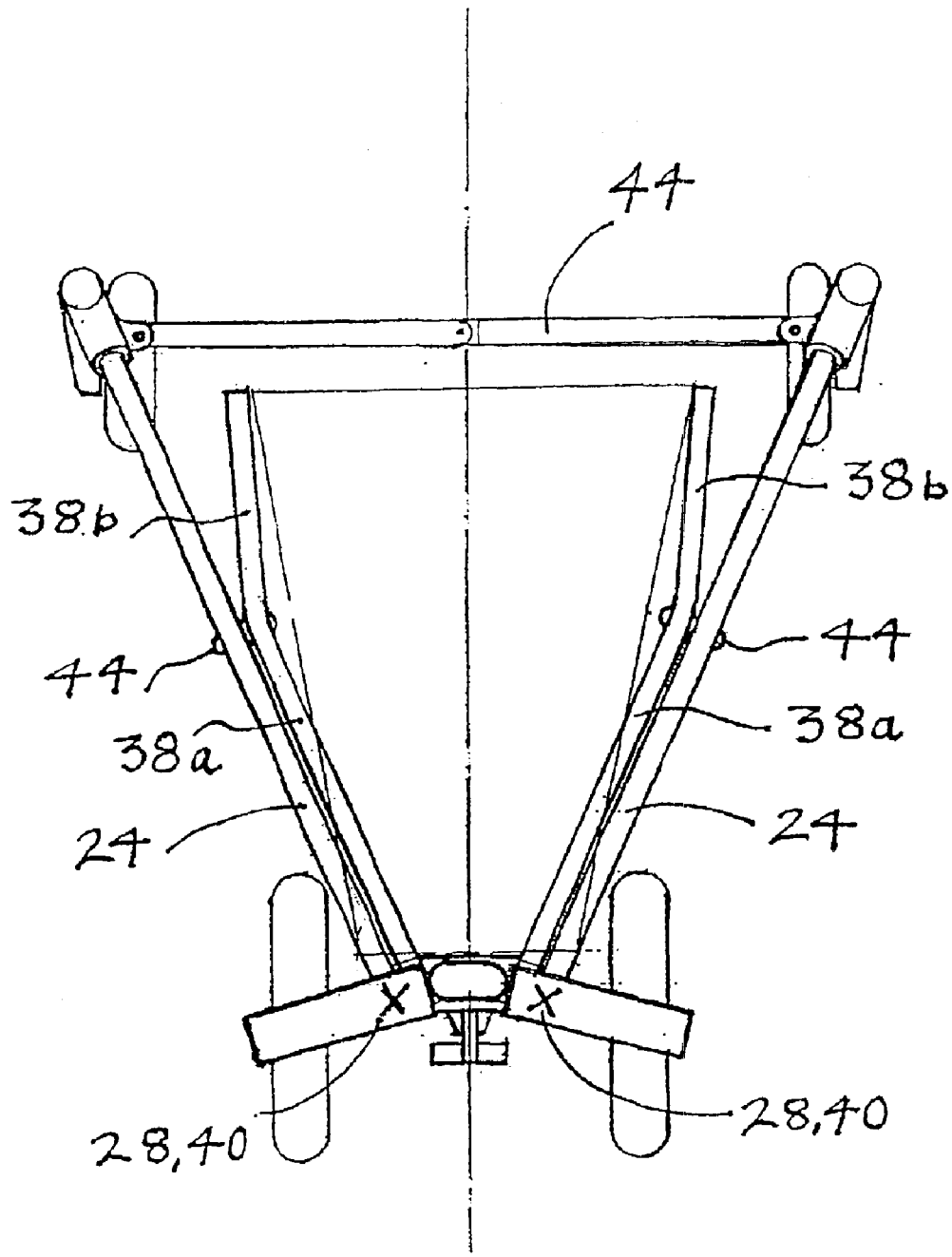
FIG. 3 is a plan view of the first embodiment along axis A of FIG. 1.

The triangular frame 24, 24, 46 is shown in the plan view of FIG. 3. Also shown is the alignment of each leg 24 and the first part 38a of the associated arm 38. The orientation of pivot joints 44, 28 and 40 and axes perpendicular to each leg 24 and part 38a is illustrated by lines running through the pivot positions (marked 'X' for pivots 28, 40). The view represented in FIG. 3 along axis A of FIG. 1 means that the position of pivot joints 28, 40 are represented by the same marking, however their relative positions are shown in FIG. 1.

The second part 38b of each arm 38, when viewed from above angles inwards to support the seat 42. In alternative embodiments the free ends of the arm parts 38b are joined by a transverse bracing strut similar to strut 46. This can be in addition to or as an alternative to the bracing strut 46.

Figure 4:
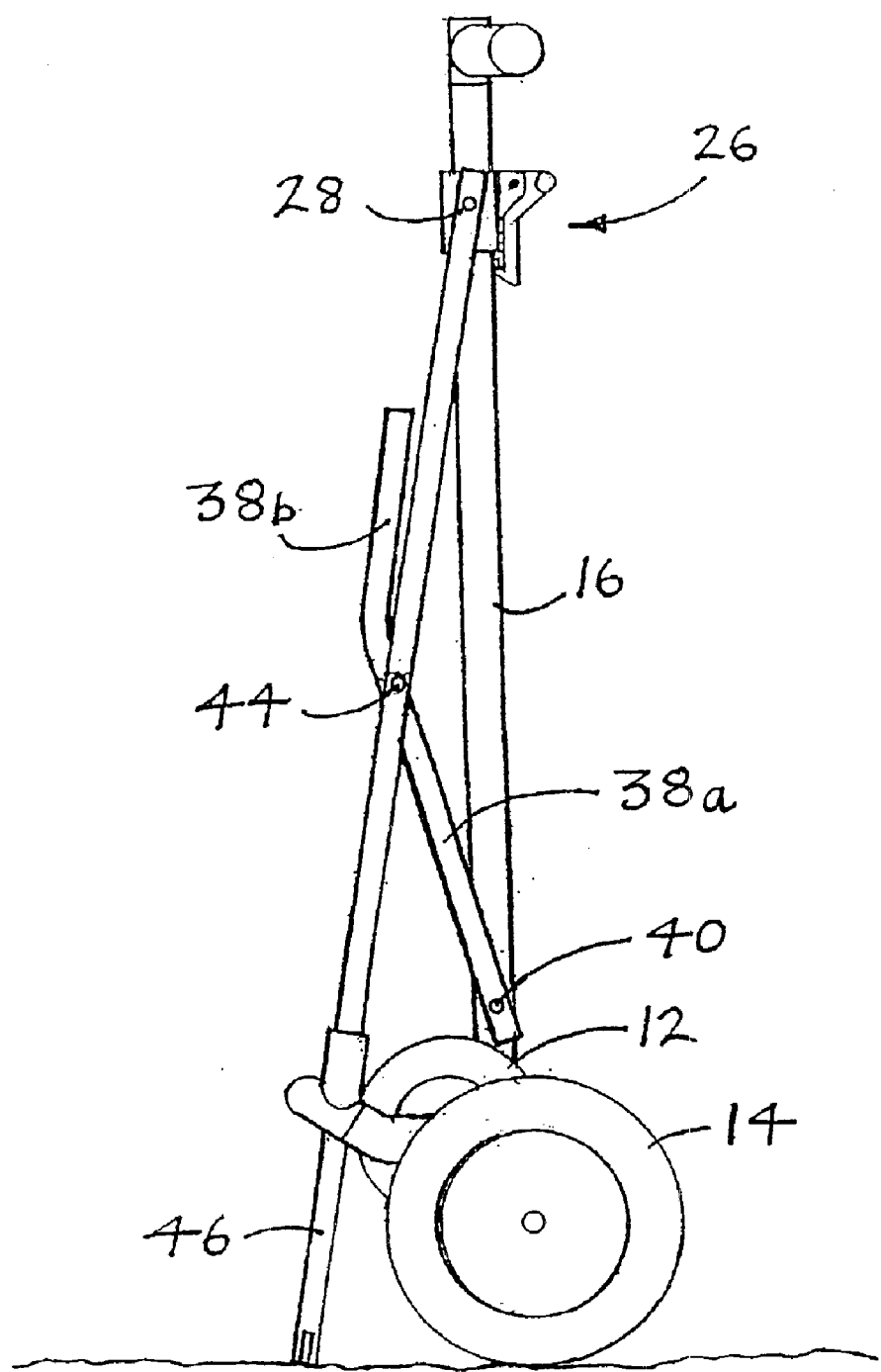
FIG. 4 is a side view of the first embodiment in its closed or folded configuration.
Figure 5:
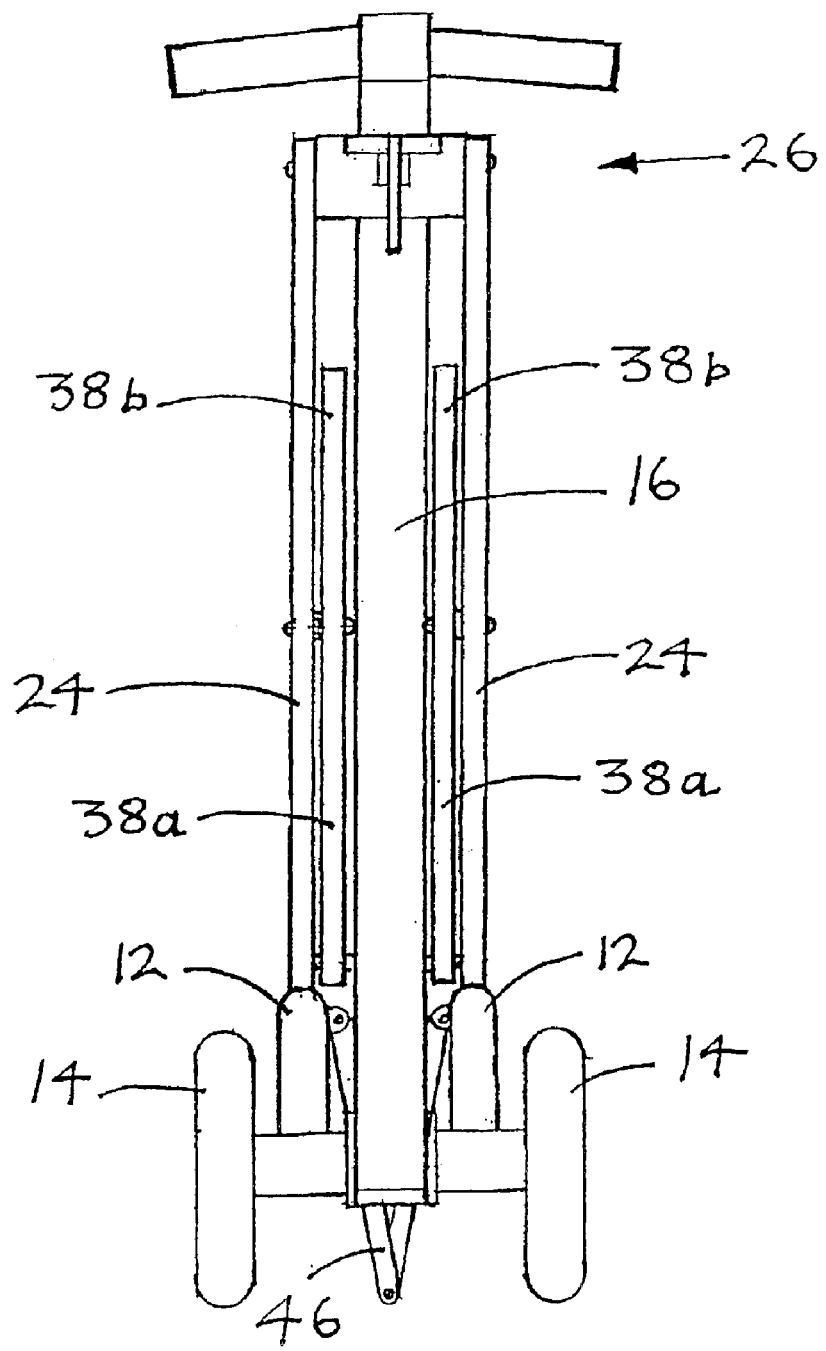
FIG. 5 is a rear view of the folded configuration of the first embodiment.

The pushchair 10 is collapsible and FIG. 4 shows the pushchair from the side in its folded or closed configuration for storage. FIG. 5 is a rear view of the same configuration. The folding process from the open configuration (FIGS. 1 to 3) to the free-standing closed configuration (FIGS. 4 and 5) will now be described.

The catch mechanism of the catch assembly of the central pivot 48 of the transverse bracing strut 46 is actuated to free the pivot 48 and allow the two sections of the strut 46 to fold together. The slider assembly 26 is raised up the spine 16 via rocker handle 30 which initially pivots on pivot joint 36 to release from the projection 34. As the slider assembly 26 slides up the spine 16 the legs 24 fold inwards reducing both the wheelbase W and track distance F. The bracing strut 46 folds outwards with pivotable movement at pivot joints 48 and 50. The arm pivot joints 40 and 44 also pivot as the slider assembly 26 slides towards its uppermost position on the spine 16. During folding, the legs 24 and the first parts 38a of the arms 38, due to the angle of pivoting of pivot joints 44, 28 and 40, fold from a splayed orientation in the open configuration to a generally parallel orientation (see FIGS. 4 and 5) in the closed configuration. At the same time the bracing strut 46 folds into a closed V-shape (see FIG. 5) and acts as a footstand 52 in the closed configuration A part associated with the bracing strut 46, such as a part of the catch assembly, can act as part of the footstand 52 in an alternative embodiment.

FIG. 5 shows how the front wheels 12 fold in either side of the spine 16 in the closed configuration. The closed configuration itself is maintained via a mechanism of some sort which can be disposed in a number of positions.

During the folding process the rear wheel track R distance remains unchanged but in an alternative embodiment, only one central rear wheel is used. In the embodiment described a brake mechanism (not shown) is associated with the rear wheels 14.

The unfolding process is broadly similar to the folding process but in reverse. The mechanism maintaining the closed configuration is released and the slider assembly 26 guided down the spine 16. The arms and legs 38, 24 splay out and the transverse bracing strut 46 opens and is locked straight. The slider assembly 26 is locked in its lower position with the rocker handle 30 re-engaging the projection 34. The pushchair 10 is then ready for use.

It is possible to provide a manually-operable control lever or the like on the handle bar which enables the release of the catch mechanism and/or the rocker handle 30 e.g. by means of a cable.

Figure 6:
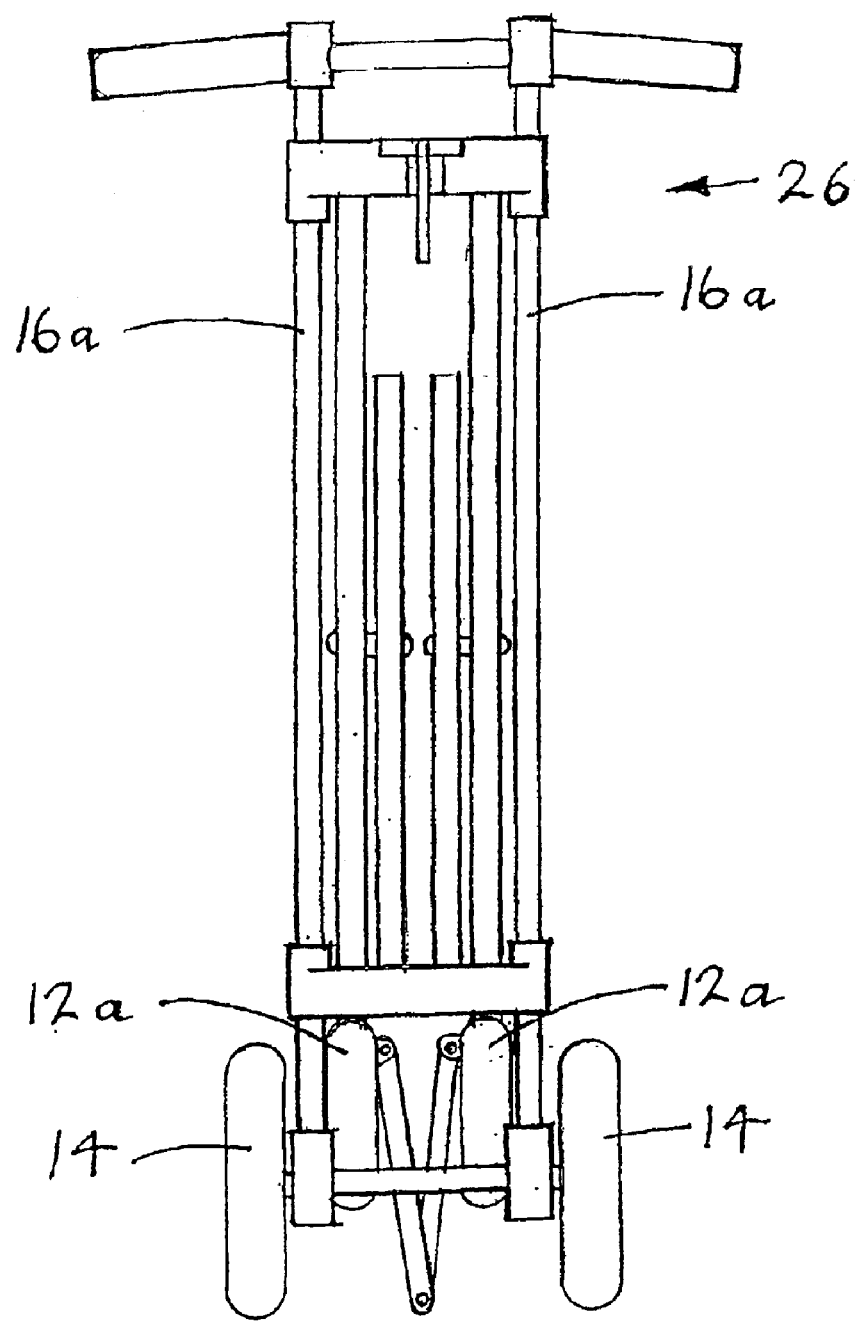
FIG. 6 is a rear view of the folded configuration of a second embodiment.

FIG. 6 is a view corresponding to FIG. 5 but representing another embodiment with a double spine construction. The spine 16 of the main embodiment is here replaced by two spine members 16a. The general structure and folding process of the embodiment in FIG. 6 is similar to that of the embodiment of FIGS. 1 to 5. FIG. 6 does however illustrate a difference between the two embodiments in the folded configuration as the front wheels 12a can be seen to fold to a position between the spine members 16a A slider assembly 26a of modified construction to slide along the two spine members 16a is also shown.

As will be appreciated, the seat 42 rather than being a rigid structure is made from a fabric-like material which acts as a hammock-style seat in the open configuration but is folded in the closed configuration A variety of man-made or natural materials may be used and the seat can be made from several panels and supports. In one embodiment the seat has a base made from a lattice material to allow debris to fall through and has side and back panels made from a different material. The frame of the pushchair comprising the spine, arms, legs and bracing strut in one embodiment are formed of extruded aluminium.

What is claimed is:

1. A wheeled collapsible pushchair or carrier comprising a seat, elongate support means to support the seat and at least one generally upstanding elongate spine, rear wheels supported at the lower end of the spine, the seat support means being slidably and pivotably connected to the spine, said pushchair being able to adopt either an open configuration with the seat support means extending away from the spine or a closed stowed configuration, wherein the support means takes the form of two support legs, each with a front wheel at one end and slidably and pivotably connected at the other end to the at least one spine so that in the open configuration the legs splay out from the at least one spine towards the associated front wheel and in the closed configuration the two support legs and spine are in a substantially parallel or near parallel orientation with the front wheels between the rear wheels.

2. A pushchair according to claim 1, wherein the front wheels lie wholly within the space defined by the perimeter of the rear wheels when the pushchair is in the closed configuration.

3. A pushchair according to claim 1, wherein the front and rear wheels maintain their ground contacting relationship in both the open and closed configurations.

4. A pushchair according to claim 1, wherein the rear wheels adopt the same ground contacting relationship in both the open and closed configurations and the front wheels lie alongside the rear wheels in the closed configuration.

5. A pushchair according to claim 1, wherein the front wheel track distance (F) and the wheelbase (W) but not the rear wheel track distance (R) are smaller in the closed configuration than the open configuration.

6. A pushchair according to claim 1, further comprising auxiliary support means to support said elongate support means.

7. A pushchair according to claim 6, wherein said auxiliary support means are in the form of two elongate cranked support arms, each support arm being pivotably connected at one end to the at least one spine and being pivotably connected to an associated support leg.

8. A pushchair according to claim 1, further comprising an elongate transverse member extending between the support legs and pivotably connected thereto, said transverse member having an intermediate assembly which in the open configuration is lockable to brace the legs and which is pivotable to allow the transverse member to be folded in the closed configuration.

9. A pushchair according to claim 8, wherein said transverse member or part associated therewith acts as a stand in the closed configuration.

10. A pushchair according to claim 1, wherein said at least one spine takes the form of two parallel spines.

11. A pushchair according to claim 1, wherein the front wheels are carried by wheel assemblies which can be swiveled to steer the pushchair in the open configuration.

* * * * *